O. J. GROEHN.
FILLER CAP.
APPLICATION FILED JUNE 18, 1912.
1,087,167.
Patented Feb. 17, 1914.
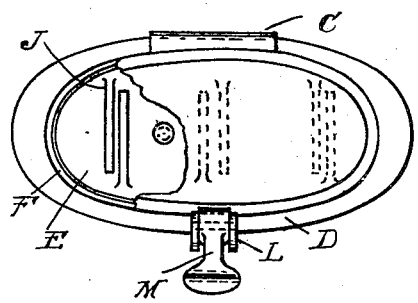
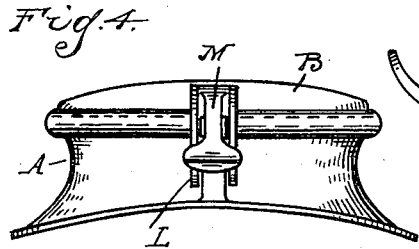
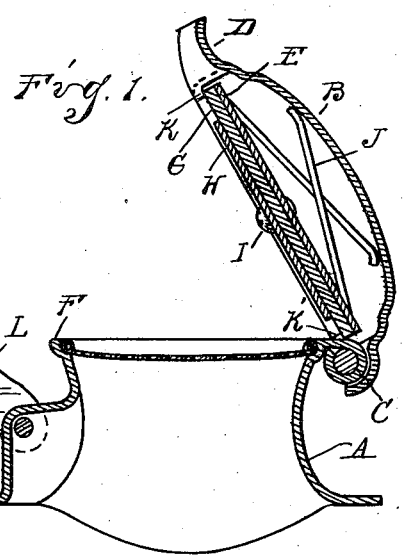
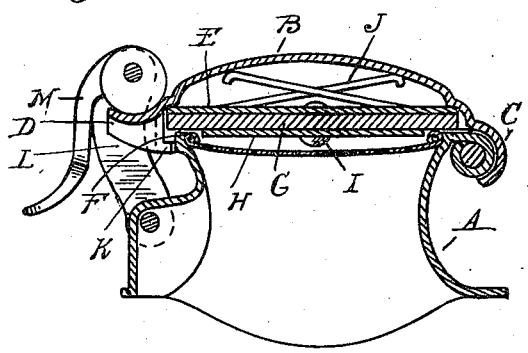

UNITED STATES PATENT OFFICE.

OTTO J. GROEHN, OF DETROIT, MICHIGAN, ASSIGNOR TO BRISCOE MANUFACTURING COMPANY, OF DETROIT, MICHIGAN, A CORPORATION OF MICHIGAN.

FILLER-CAP.

1,087,167.  Specification of Letters Patent.  Patented Feb. 17, 1914.

Application filed June 18, 1912. Serial No. 704,331.

*To all whom it may concern:*

Be it known that I, OTTO J. GROEHN, a citizen of the United States of America, residing at Detroit, in the county of Wayne and State of Michigan, have invented certain new and useful Improvements in Filler-Caps, of which the following is a specification, reference being had therein to the accompanying drawings.

The invention relates to filler caps for liquid containers, being more particularly designed for use in connection with automobile radiators and for similar purposes.

It is the object of the invention to provide means for quickly opening and closing the filler, and for forming a liquid-tight seal in the closed position.

To this end the invention consists in the novel construction of a cap having a yieldable seat, and further in the peculiar construction, arrangement and combination of parts as hereinafter set forth.

In the drawings: Figure 1 is a cross section through the filler and cap in open position. Fig. 2 is a similar view showing the parts in closed position. Fig. 3 is a sectional plan view. Fig. 4 is a front elevation.

A is the filler neck for a radiator or other liquid container, and which as shown is of an oval form.

B is a cap preferably formed from sheet metal and having a hinged portion C and an oppositely projecting lug portion D for engagement with a locking member.

Heretofore caps have been provided with sealing faces of soft material such as leather or rubber, designed to form a liquid-tight joint; but experience has demonstrated that with such devices after they have been in use for a time, the material becomes permanently compressed and the joint leaky. I have avoided this objection by providing a yieldable cushion within the filler cap not dependent upon the resiliency of the facing material, and which will at all times seal the joint when the cap is closed.

As preferably constructed the yieldable cushion is formed by a plate E fitting within the cap and overlapping the top edge F of the filler neck. This plate E is provided with a facing G of suitable sealing material—such for instance as cork—and the facing is secured by a bottom plate H limited to clear the flange F, and secured to the plate E by screws I or other securing device. A resilient back for the plate G is arranged between the same and the cap B, this being preferably formed by oppositely extending tongues J struck out from the metal of the plate. Outward movement of the plate is limited by suitable stops on the cap, preferably by turning in the edge of the cap as indicated at K and K', after the plate E with its facing has been inserted. The turned-in flange K will clear the flange F of the filler, so that the cork facing will bear on the latter, while the resilient tongue members J will hold this facing in sealing contact.

To lock the cap in closed position a suitable locking device is provided, which, as shown, comprises the links L pivoted to the member A and at their opposite end connected with a cam lever M, which is adapted to engage with the lug D on the cap. This cam lever when turned in the position shown in Fig. 2 will depress the cap while the resilient tongues J will yield to permit the corresponding yielding of the plate E and facing G. Thus without regard to the wear or compression of the facing material the cap will at all times be maintained liquid tight.

What I claim as my invention is:

1. The combination with a hollow cap member of a liner plate therefor having a resilient tongue struck out therefrom and bearing against the inner face of said cap, and a sealing facing secured to said plate.

2. The combination with a filler of a hollow cap hinged at one side to said filler, a locking lug upon the opposite side of said cap, a yieldable liner plate within said hollow cap having resilient means bearing against the inner face of said cap, and locking means adapted to engage said lug to depress the cap over said filler.

3. The combination with a filler of a hollow cap member hinged at one side to said filler, a locking lug positioned upon the opposite side of said cap, a lining member within said hollow cap member, provided with a facing adapted to bear against the upper edge of said filler, an inturned flange upon said cap for retaining said lining member and clearing the edge of said filler, a resilient member for yieldably pressing said lining member against said retaining flange, and locking means adapted to engage said lug to depress the cap over the filler against the tension of said resilient member.

In testimony whereof I affix my signature in presence of two witnesses.

OTTO J. GROEHN.

Witnesses:
    JAMES P. BARRY,
    DELBERT COLLINS.